United States Patent [19]
Etchison et al.

[11] 3,950,728
[45] Apr. 13, 1976

[54] CODED CARRIER REMOTE CONTROL SYSTEM

[75] Inventors: Alan D. Etchison, Verona; William E. Higgins, Pittsburgh, both of Pa.

[73] Assignee: Westinghouse Air Brake Company, Swissvale, Pa.

[22] Filed: Oct. 8, 1974

[21] Appl. No.: 513,149

[52] U.S. Cl. .................. 340/147 LP; 340/147 SY
[51] Int. Cl.² ..................................... H04Q 9/00
[58] Field of Search .......... 340/147 LP, 152 R, 163, 340/147 SY, 147 C

[56] References Cited
UNITED STATES PATENTS

| | | | |
|---|---|---|---|
| 3,288,919 | 11/1966 | Abbott | 340/147 LP |
| 3,300,758 | 1/1967 | Hawley | 340/147 LP |
| 3,665,398 | 5/1972 | Kawai | 340/147 LP |
| 3,772,651 | 11/1973 | Thyssens | 340/147 LP |

*Primary Examiner*—Harold I. Pitts
*Attorney, Agent, or Firm*—A. G. Williamson, Jr.; R. W. McIntire, Jr.

[57] ABSTRACT

Synchronizing and coordination apparatus and circuit arrangement, at a junction terminal in a coded carrier remote control system where two branch communication channels diverge from the main channel from the control office, to establish and enforce a preselected order of priority for code transmission in both directions between the control office and stations connected along the main and branch channels. Each section of the channel network is provided with separate carrier apparatus to transmit codes in both directions. Retransmission means at the junction repeat control codes received from the office to all branch and satellite stations and indication codes received from these stations to the office office. Control codes from the office and indication codes from main channel stations are given first and second transmission priority, respectively. Indication codes from junction terminal satellite stations are third in priority order, over similar codes from stations along both branch channels. This is enforced by locking out such branch stations in response to the initiation of a code from a satellite station. Stations along a selected one branch are given the next order of priority, also enforced by locking out the other channel stations, which thus have the lowest priority for transmitting codes.

10 Claims, 5 Drawing Figures

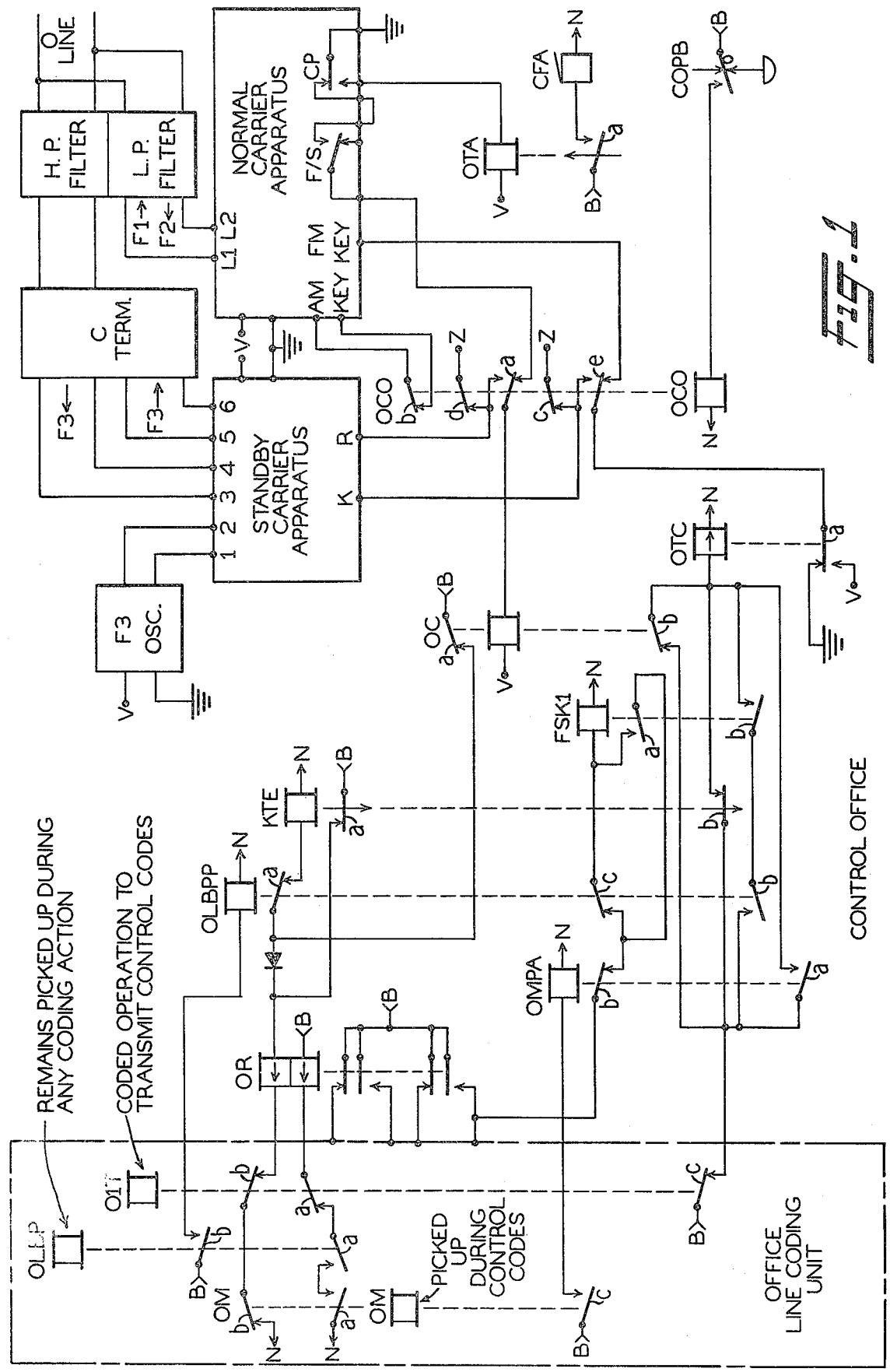

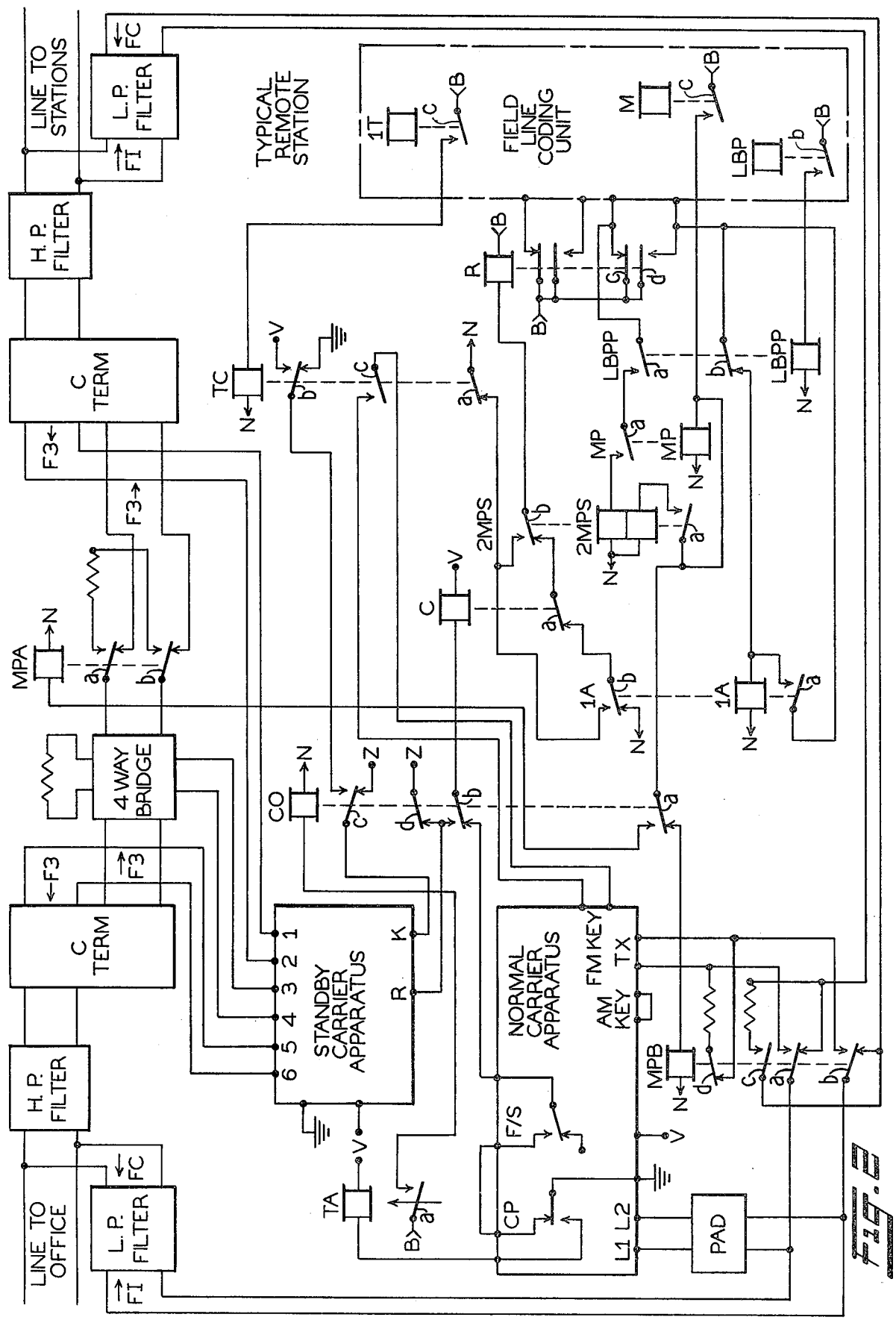

JUNCTION LOCATION

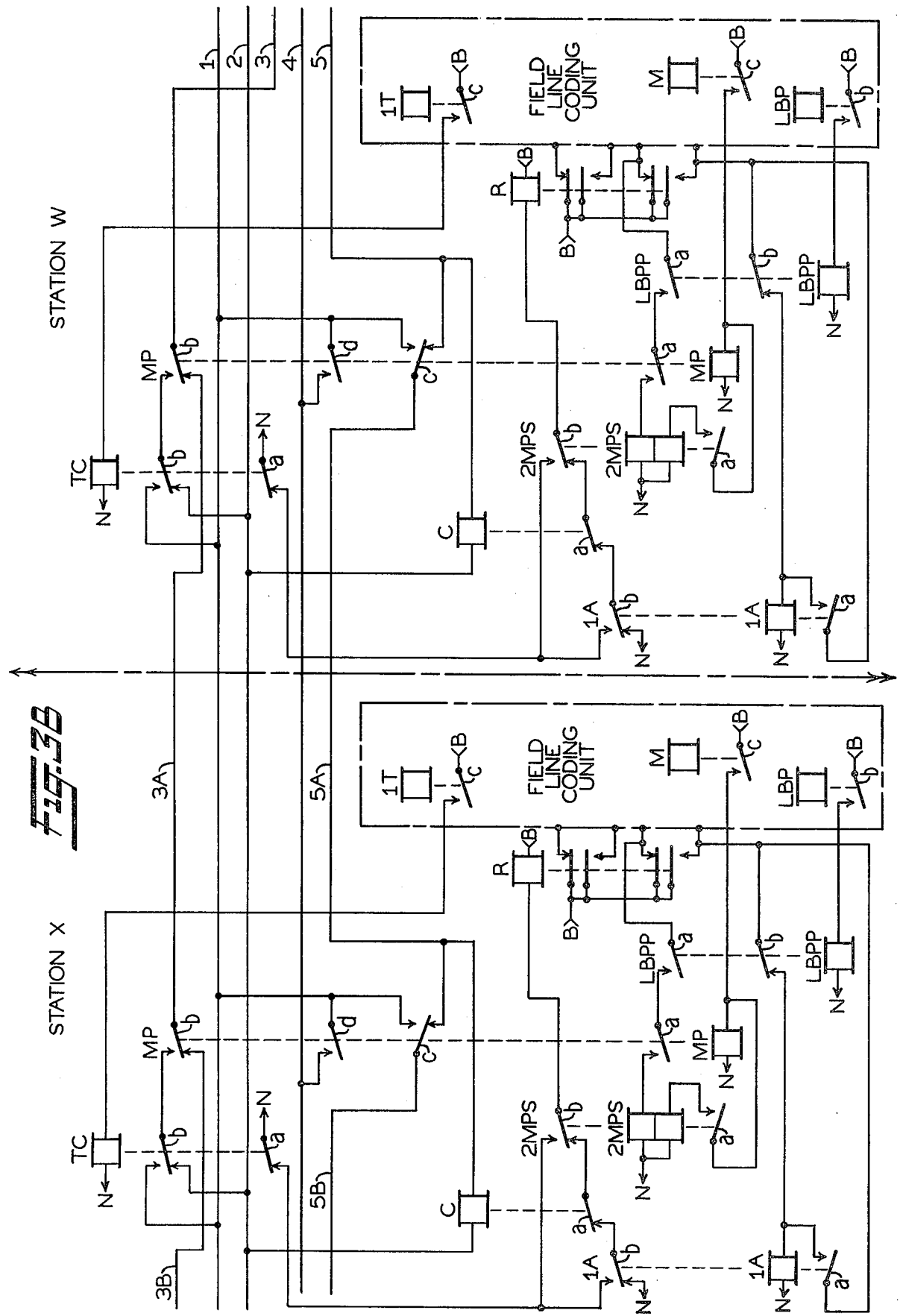

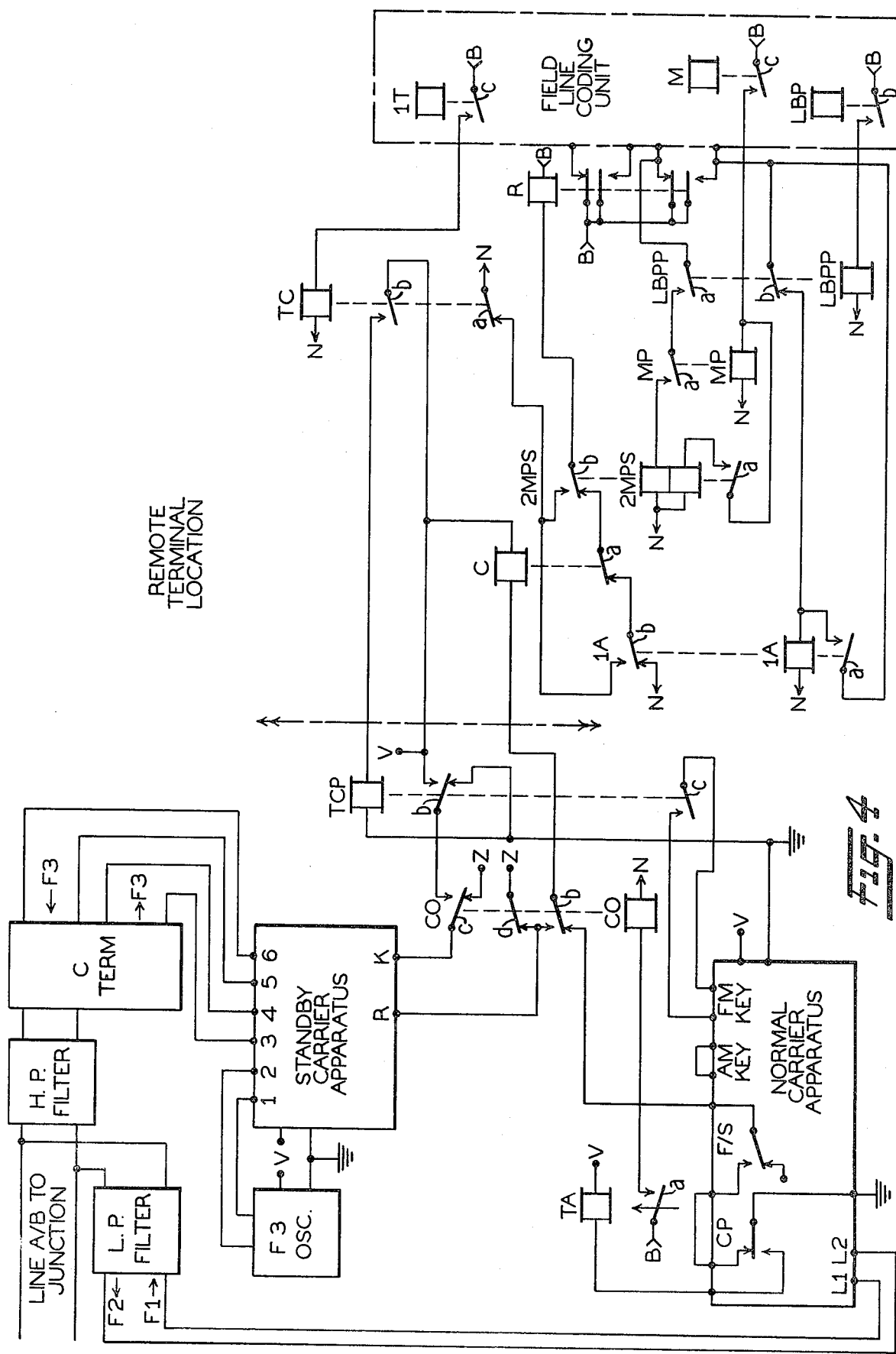

CODED CARRIER REMOTE CONTROL SYSTEM

BACKGROUND OF THE INVENTION

Out invention pertains to a coded carrier remote control system. More particularly, this invention relates to a coded carrier remote control system including a new and novel arrangement to coordinate and synchronize the operation of such a system when the communication channel from the control office branches at a remote junction location to follow separate paths to two different remote terminal locations.

Coded carrier remote control systems have been previously used in the remote control of railroad traffic systems. Such coded carrier is used in lieu of the older coded direct current systems to utilize various new types of communication channels and to allow longer distances of transmission between the control office and remote locations of a single system. One specific railroad traffic control installation required expansion to handle additional traffic mileage. This added stretch of track branches from the original main track route at a location along the way, that is, it diverges short of the original remote terminal. It was desirable to control the entire track length, that is, the old main and the new branch, by the existing remote control system with the necessary modifications to add additional controlled stations. These modifications require synchronization and coordination of system operation between the stations along the two branch channels and the control office. Such synchronization is particularly required during the transmission from the remote locations of indications of the conditions of the apparatus in order that such conditions may be recorded and displayed at the control office. While specific modifications will vary between the various specific types of coded carrier remote control systems which might be used under such a situation, certain basic principles pertain to all types of coded remote control operation.

Accordingly, an object of our invention is a coded carrier remote control system which includes the necessary synchronizing and coordinating apparatus to provide single system operation between the control office and a number of remote stations located along separate branches of the communication channel.

Another object of our invention is a novel synchronizing and coordinating arrangement at the remote junction location of two or more branches of the communication channel for a coded carrier remote control system which provides control of the transmission of control and indication functions between the central control office and the various stations located along each branch of the communication channel.

A further object of the invention is apparatus for synchronizing the operation of a coded carrier remote control system in which some of the remotely located stations are positioned along a branch of the main communication channel, which branch diverges at a junction remote from the control office.

Yet another object of the invention is a synchronizing arrangement for a coded carrier remote control system which assures priority of transmission to control codes carrying control or command functions from the central office and the transmission of only one indication code at a time from the various stations located along at least two branches of the system communication channel.

A still further object of our invention is apparatus for synchronizing and coordinating the operation of a coded carrier remote control system in which at least one branch communication channel, which connects more than one station into the system, diverges at a junction point intermediate the control office and the remote terminal station of the main communication channel.

Other objects, features, and advantages of our invention will become apparent from the following specification and appended claims when taken in connection with the accompanying drawings.

SUMMARY OF THE INVENTION

In specifically defining the practice of our invention, a coded carrier remote control system is described which embodies the inventive apparatus arrangement and which includes a main communication channel between the control office and a junction terminal location and two separate branch communication channels extending beyond the junction and diverging along different paths to two separate and distinct remote terminal locations. One or more intermediate field stations are connected to each section of the communication channel network. Two or more local stations in the vicinity of the junction location are controlled as satellites of the junction terminal apparatus. Each channel portion is provided with normal and standby carrier apparatus for transmitting codes in each direction over that channel section. As specifically shown, each normal carrier apparatus set transmits codes by frequency shift keying, with a different base frequency assigned to each direction. The base frequency for each direction is normally transmitted to check the operability of the apparatus and channel. The standby carrier apparatus is specifically illustrated as a type using AM keying with the same frequency transmitted in each direction but over different circuits, so that simultaneous transmission in each direction, as or when required by system operation, is possible. In the inactive system condition, i.e., no coding action, there is no output from the carrier receivers, whether normal or standby is in use, at any location. Said in another way, the carrier currents normally transmitted over the channel sections represent the noncoding or inactive condition for the coded remote control systems.

For purposes of this description, the specific code format is assumed to be that of the well known time code arrangement. A specific example of such a remote control system is disclosed in U.S. Pat. No. 2,698,425, issued on Dec. 28, 1954 to A. B. Miller for a Remote Control System. A carrier current modification of the same type of apparatus is described in the service manual entitled "Time Code Control System, Type L, Form 514A". Published in 1960 by the Union Switch and Signal Division of Westinghouse Air Brake Company, the assignee of this present application.

Since, in a remote control system of this type, code transmission may originate simultaneously at the office and at any station or any two or more stations, a code transmission priority must be established to insure proper operation. In the specific showing herein typical of any installation, the following transmission priority is adopted:

a. control codes from the central office to any station location, b. indication codes originating at remote stations along the stretch of single communication channel from the central office to the junction terminal, that is, the near stations in a conventional operation manner, c. indication codes originating at local satellite stations connected by a direct current line circuit extending a short distance from the junction carrier terminal, d. indication codes originating at stations along one branch of the communication channel beyond the junction location, e. indication codes originating at stations along the other branch channel.

Although a typical transmission priority is thus designated, the manner of exercising the priority in any specific system depends to some degree on the type of carrier channel in use.

In the illustrated system, a normal carrier channel is provided for each leg of the system. The first channel extends between the central control office and the junction location over whatever communication apparatus is being used. Each branch line is provided with a separate and similar carrier channel extending from the junction location to the end of the branch line at the remote terminal station. Each such normal carrier channel is similar in apparatus and operation except that the transmission direction of the two frequencies is reversed in both branch channels beyond the junction to eliminate ringing problems, that is, regenerative feedback within the carrier terminal apparatus at the junction location. In addition to each of the two branch channels, a short direct current line circuit connects stations in the immediate vicinity of the junction to operate as satellites of the junction terminal apparatus. Also as specifically shown, standby carrier apparatus is provided which extends from the office location and branches at the junction along both legs of the system. For illustration purposes, this standby channel transmits the same frequency in each direction from the office through the junction terminal to the remote terminal stations but separate transmission circuits in each direction are provided. This standby channel is normally used for other communication purposes and changed over to the remote control system only when needed due to failure within part or all of the normal apparatus.

As is conventional and was indicated by the previous listed priority chart, control codes in a time code remote control system always take precedence over indication codes originating at any remote station. Such control codes transmitted from the central office are received by all station apparatus and terminals and override any simultaneously initiated indication code. Once transmission is under way, a control code locks out the initiation of an indication code at each station. Such control codes are selectively registered only by the single station addressed by the station selection portion of the code and the control functions transmitted are executed only at the selected station. In the arrangement shown, the intermediate stations along the single communication channel stretch to the junction exercise priority by interrupting the carrier channel to the more distant stations when a code is initiated. This is somewhat similar to a conventional direct current line system in which a shunt is placed across the line to the more distant stations which are thus locked out until the communication channel is restored to its normal conditions. A similar arrangement exists at each intermediate station along both branch lines between the junction terminals and the remote terminal stations in order that they may exercise their priority over other more distant stations connected along the same branch channel. The stations between the active station and the central office are held busy, and thus inhibited, once a code is inhibited, by the retransmission of the indication code received at the office by the office carrier apparatus over the control code frequency. As specifically shown, the primary channel to the office from the transmitting intermediate station is transferred to the local station transmitter output and the more distant channel portion is shunted while normal carrier equipment is in use. The distant stations thus get no answer back from the office and therefore cannot continue in the transmission of any code simultaneously initiated. If the alternate or standby carrier is in use, the line to the distant stations is open so that the carrier circuits are interrupted and transmission is not possible.

At the junction terminal, several different aspects of the transmission priority must be exercised. When an indication code is initiated by one of the local satellite stations connected to the junction terminal by the d.c. line, the normal carrier transmitters for each branch channel are keyed to transmit a frequency shifted signal, i.e., a space condition, to lock out the distant stations along each branch channel. This provides transmission priority to the local stations which exercise their own priority over each other in accordance with the distance from the terminal location at which they are connected to the satellite line. If the standby apparatus is in use, the transmitting connections between the office and each branch channel are interrupted when a code is received at the junction terminal from the local stations to be retransmitted to the central office. This locks out the branch stations from transmitting an indication code by preventing the retransmission of an indication code from the office to the branch channel stations to drive the coding action. When an indication code is first received by the normal carrier apparatus assigned to the selected priority branch channel, the other branch transmitter is held keyed by a receiver repeater arrangement to lock out the stations along that branch line. When standby apparatus is in use, the lower priority branch channel is opened to lock out those stations. Finally, after an indication code from the lower priority branch channel is initiated and is being transmitted, the other stations along the priority branch and on the satellite line are locked out by the retransmission of the received code from the office over the control frequency.

BRIEF DESCRIPTION OF THE DRAWINGS

We shall now describe a specific arrangement embodying our invention and then define the novelty thereof in the appended claims. During this specific description, reference will be made from time to time to the accompanying drawings in which:

FIG. 1 is a partly schematic circuit diagram of an arrangement at a control office for a coded carrier remote control system, which system embodies our invention.

FIG. 2 is a similar circuit diagram of the apparatus arrangement at a typical intermediate remote station controlled by the central office of FIG. 1 which is located along the main communication channel or either of the two branches between terminal and junction locations.

FIG. 3B, when placed adjacent to and at the left of FIG. 3A with the referenced line circuit interconnections matching, illustrates in circuit diagram form the direct current line circuit from the junction terminal location to local satellite remote stations.

FIG. 4 is a similar illustration of the circuit arrangement at the remote terminal of either branch communication channel, together with the apparatus at an associated remotely controlled field station.

Figure 3A:
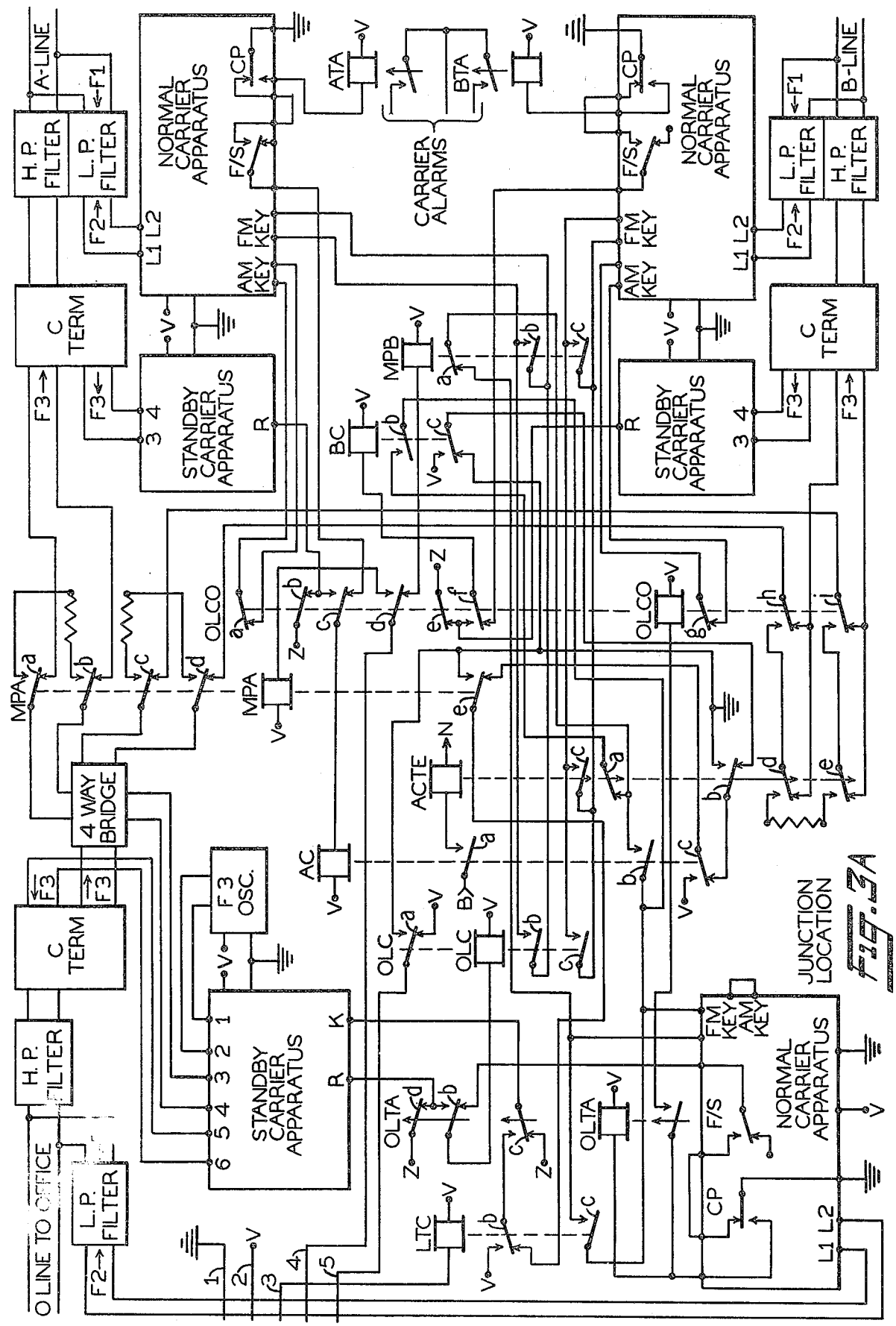
FIG. 3A is a circuit diagram of the carrier terminal and circuit arrangement at the junction location between the main channel from the office and the two branch channels, which apparatus arrangement embodies the novel features of our invention.

In each of the drawings, similar reference characters designate similar parts of the apparatus at each location represented in the drawings. The required sources of direct current operating energy are provided although not specifically illustrated, since such sources are well known. Rather, the positive and negative terminals of a low voltage source to provide energy for most relays and for the coding units are designated by the reference characters B and N, respectively. A higher voltage source to provide energy to the various carrier current apparatus and the directly associated relays is represented by the terminal V and the conventional ground symbol. Terminal V may be either positive or negative with respect to the ground connection as required by the specific carrier apparatus in a particular installation. The line coding units for both the office and field stations of the example 514A system are designated by dot-dash rectangles at the various locations where present. Illustrated within the conventional box are only the contacts of a first transmitter relay 1T, a master relay M, and one of the timing chain relays LBP. These three relays of the coding unit provide coordination and control to the various illustrated interface relays and circuitry of the carrier apparatus. Reference may be had to the aforementioned Miller patent or the published service manual for the full operation of such relays. Notes included in FIG. 1 in connection with the office line coding unit briefly defined the operation of each of these types of relays within the coding unit. The same type of operation is provided by the similarly referenced relays within the field line coding units at the station locations.

DETAILED DESCRIPTION OF THE ILLUSTRATED EMBODIMENT

At each location, the carrier apparatus is illustrated by conventional blocks since various specific types of carrier equipment may be used and our invention is not concerned with the internal details of such apparatus. Rather our invention is concerned with the interface between the coding units and the carrier apparatus to provide the synchronization and coordination of the system operation. However, for a specific explanation, it is herein assumed that the normal carrier apparatus is of the type known as Noller Carrier. This equipment transmits by frequency shift keying with a selected transmitter frequency for one direction over the channel and a different receiving frequency from the other direction over the communication channel. Each transmitter/receiver unit is provided with a hybrid or bridging module in accordance with its location at a terminal position on the channel or at an intermediate station location, respectively. Referring now to FIG. 3A, the lower left carrier unit is of the Noller type with, for example, a hybrid module since it has a terminal position in the single communication channel from the office. In this apparatus, the AM key terminals must be bridged by a circuit connection to activate the transmission of any carrier current of the base frequency. The FM key terminals, when bridged by a completed circuit, actuate a frequency shift to transmit the selected shift frequency carrier. The output terminals L1 and L2 are coupled across the transmission channel here shown as a line wire circuit. However, this communication channel can be a microwave channel and even, under certain conditions, a high frequency radio channel. The necessary and required coupling filters are provided, as illustrated by the conventional blocks since such filtere units are well known.

Within the transmitter-receiver unit of the carrier apparatus, a conventionally shown contact CP detects the proper operation of the apparatus and is normally picked up to close against its upper or front contact. When the local unit is not operating properly so that carrier current is not being transmitted, or when an absence of carrier current received from the other end of the channel occurs, contact CP is released and closes in its back contact position to repeat the failure of the unit or channel. Under these conditions, a circuit is completed for a local terminal alarm relay, here shown as relay OLTA. The circuit is completed from the ground terminal over the back contact of CP and through the winding of relay OLTA to terminal V of the source. The relay TA associated with each such normal carrier unit is provided with slow acting characteristics so that it picks up to close front contacts only after the expiration of a selected time period, normally on the order of about sixty seconds, which bridges any lock-out condition during normal coding action at another station and the expected transitory faults on the communication channel. This slow pickup characteristic is indicated in a conventional manner by the upward pointing arrow drawn through the movable portion of the relay contacts.

A second contact F/S shown within the carrier unit is normally released to close against its back contact. This contact picks up only when the input carrier signal at the line circuit connections L1 and L2 shifts from the basic frequency to the alternate or frequency shifted level in accordance with a pulse being transmitted from the carrier apparatus at the other end of the associated channel segment. It may be noted that, with contact F/S picked up, a circuit is completed within the carrier apparatus from the ground terminal over front contact CP, a bridging connection, and front contact F/S to another external terminal of the carrier unit, as will be further described.

When the normal carrier apparatus is provided with a bridging module, as in FIG. 2, another set of output terminals TX are provided from which the carrier current is transmitted, the normal channel connections L1 and L2 being merely for the reception of current from other locations. When the unit transmits, terminals TX are also coupled to the communication channel in the conventional manner. At the control office shown in FIG. 1, the normal carrier apparatus, although provided with a hybrid module as in FIG. 3A, nevertheless has only a single FM key terminal which is externally connected between terminal V and the ground connection of the higher voltage source in order to actuate the transmission of frequency shift code pulses.

In one specific installation and here shown to illustrate the versatility of the arrangement, the standby carrier apparatus is of a different type. For example, in FIG. 1, the standby carrier unit shown by conventional block in the upper right may be a type E4B carrier unit. Such units transmit the same frequency signal in each direction, although independently. Herein this is assumed to be a frequency F3 which is established at each transmitting location by a separate oscillator such as the F3 oscillator illustrated in FIG. 1 by a conventional block, since any known type may be used. This external oscillator unit is connected to terminals 1 and 2 on the standby carrier transmitter-receiver apparatus. The input and output terminals 3–4 and 5–6 are coupled to the channel through a type C carrier terminal and appropriate filters. A keying terminal K, when the unit is in use, is alternately connected to terminal V and the ground terminal of the higher voltage source over a coding contact of the office code transmitting interface relay OTC. The receiving output terminal R is connected, when standby units are in use, to the office carrier receiver relay OC of the interface apparatus. This relay is normally released to detect the nontransmitting or noncoding condition, both when it is used with the normal carrier channel or apparatus or with the standby carrier units. The two channels or circuits provided by the standby carrier apparatus are normally used for the transmission of other information, for example, telephone dialing pulses. The output and input terminals for such alternate use are identified as terminals Z. Such terminals Z are connected to the K and R terminals of the standby carrier apparatus over back contacts of changeover relays, here at the office the relay OCO. Similar alternate use output terminals Z are shown at each of the locations together with corresponding changeover relays designated CO. The positions of all relays shown in the drawings are those occupied when power is applied to the carrier units, base frequency carrier current is being transmitted and received on the normal carrier channel, but no coding is in progress anywhere in the remote control system.

Initially, before describing control and interface circuits, we shall define the assumed installation. A main or office line communication channel extends from the control office location of FIG. 1 as a single channel to the junction terminal location which is illustrated in FIG. 3A. Along this single channel are intermediate remotely controlled stations which are typically provided with apparatus as shown in FIG. 2. From the junction terminal location, two branch communication channels, the A line and B line, extend along different routes to remote terminal locations, an example of which is shown in FIG. 4. Along each of the branch communication channels may also be located intermediate stations such as shown in FIG. 2. In the vicinity of the junction terminal location are two or more local stations controlled from the office such as stations W and X shown in FIG. 3B. These operate as satellites of the junction terminal location and are coupled thereto over a five wire direct current communication line.

Turning now to FIG. 1, the office line coding unit is designated by the dot-dash block at the left of the figure. Only three relays are shown within this coding unit since such provide all of the control, through the interface apparatus, of the carrier equipment. The office master relay OM is picked up when the unit is conditioned to transmit control codes and remains up continuously during such code transmission. The timing chain relay OLBP remains picked up during any coding action, whether transmitting or receiving. This relay picks up during the first step of such codes. The office first transmitter relay O1T provides the coded operation, as controlled by the remaining portion of the coding unit, to actuate the transmission of codes from this location, specifically the control codes of the system. Reference is again made to the previously cited service manual 514A for a complete description of the operating and control circuits of these relays and the remaining circuits within the coding unit. However, such operation and circuitry is not part of the specific novelty of the present invention. External to the coding unit but associated therewith is the office receiver relay OR which is illustrated as a two winding, biased relay. During control code transmissions, the lower winding of relay OR is controlled by the circuit extending from terminal B through the lower winding and over back contact *a* of relay O1T and front contacts *a* of relays OLBP and OM to terminal N of the local source. During this coding action, that is, as contact *a* of relay O1T picks up and releases on alternate code steps, the two front and two back contacts of relay OR supply energy from terminal B of the source to the coding unit, as conventionally illustrated, to drive the coding unit through the various code steps. The principal control circuit for the upper winding of relay OR extends from terminal B at back contact *a* of the office carrier receiving relay OC through a diode and the upper winding of relay OR and over back contacts *b* of relays O1T and OM to terminal N. This circuit controls the relay during the reception of indication codes from any of the remote stations and is effective since the back contacts of relays O1T and OM will remain closed during indication code reception. During this code reception, the front and back contacts of relay OR once again alternately supply energy to various terminals and thence to the apparatus within the coding unit to register the incoming code. A secondary control circuit for relay OR includes front contact *a* of the indication time element relay KTE. Relay KTE is controlled by a circuit including the aforementioned back contact *a* of relay OC and back contact *a* of the timing chain repeater relay OLBPP so that relay KTE is normally energized and picked up. Because of the diode in the circuit arrangements, front contact *a* of relay KTE does not act as a stick or holding circuit for this relay. Relay OLBPP obviously repeats the closing of front contact *b* of relay OLBP and thus is picked up during the first code step and then remains up during all coding action. Relay KTE is thus deenergized during the first step of any coding action and releases at the end of its slow release period, as designated by the downward pointing arrow. When relay KTE releases during an incoming indication code, it transfers the control of the upper winding of relay OR to back contact *a* of relay OC so that the initial release of relay OR during indication codes is slightly delayed after the initial reception of the first step of the code. It is to be noted that each of the field line coding units at the remote stations is also provided with a master relay M, a first transmitter relay 1T, a timing chain relay LBP, and associated therewith a receiver relay R, all of which operate in a manner similar to that just described for the corresponding relays in the office line coding unit.

The office carrier receiver relay OC receives the incoming indication code as output pulses provided by the carrier apparatus then in use. Normally the circuit controlling this relay extends from the ground terminal at the right of the normal carrier apparatus unit over front contact CP, from contact F/S, back contact *a* of relay OCO through the winding of relay OC to terminal V. As contact F/S of the unit alternately picks up and releases as on (shifted) and off (basic) carrier pulses are received, relay OC follows the coding action. If changeover is made to the standby carrier apparatus, the circuit extends from output terminal R of this unit over front contact *a* of relay OCO to the winding of relay OC. Relays such as OC may also be of the biased type and the polarity of the winding connections will depend upon the polarity of terminal V relative to the ground terminal of the system.

The terminal alarm or carrier failure detector relay OTA is controlled by a circuit extending between terminal V and the ground connection and including back contact CP of the normal carrier apparatus so that this relay is energized only if a failure in the carrier communication channel occurs while the normal apparatus is in use. Relay OTA is a slow pickup type having a selecting period of approximately 60 seconds. When its front contact *a* closes, the circuit is completed for energizing the carrier failure alarm device CFA to indicate to the system operator that a normal carrier channel failure has occurred. Device CFA is shown as a buzzer but a bell and/or visual indication may be provided. Other failure alarms at remote terminal locations may be transmitted to the system operator at the control office over various carrier circuits within, for example, the C terminal system. Such alarms are not shown but would be similar to the device CFA and have associated therewith, if desired, visual indications. The changeover at the office to the standby carrier apparatus is a manual operation. The operator, upon receiving a failure alarm indication, operates the push-pull, stick push button COPB to energize the changeover relay OCO. Once pushed, the push button COPB remains with its contact closed until the operator reverses the changeover by pulling the button to its open contact position. At the various remote terminal locations, the changeover from the normal to the standby carrier apparatus is automatic when a carrier terminal alarm is actuated, as will be described in connection with the other locations. When the operator actuates a carrier changeover at the office, the opening of back contact *b* of relay OCO interrupts the bridge circuit across the AM key terminals of the normal carrier apparatus so that, if the failure exists other than in this office unit, the normal carrier transmission from the office is interrupted to actuate changeover to the standby apparatus at all other locations. Normally, standby carrier apparatus is used for other purposes as indicated by the connections from terminals K and R over back contacts *c* and *d*, respectively, of relay OCO to terminals Z of this alternate apparatus which may be, for example as previously mentioned, a telephone direct dialing system.

Also in the interface apparatus is the office carrier transmitter relay OTC which controls the transmission of the carrier pulses by both the normal and standby carrier units depending upon which is in use. When the normal carrier apparatus is in use, front contact *a* of relay OTC which is normally closed applies the ground terminal to the FM key terminal of the carrier unit. When relay OTC follows a coding action, contact *a* alternately connects terminal V over its back contact and the ground terminal as its front contact to this FM key terminal, the circuit including back contact *e* of relay OCO. Application of the potential of terminal V to the FM key terminal frequency shifts the output of the carrier unit to provide frequency shift keying for code transmission. When the standby unit is in service, the closing of front contact *e* of relay OCO connects contact *a* of relay OTC to the keying terminal K of the standby unit. During coding action, the potentials of the ground terminal and the terminal V of the higher voltage source are alternately applied to terminal K to transmit the carrier pulses which carry the coding action.

In order to transmit control codes, relay OTC is controlled by back contact *c* of relay O1T within the coding unit over a parallel circuit network including four paths. The principal circuit path is that over front contact *a* of relay OMPA, which relay repeats the closing of front contact *c* of relay OM and thus remains picked up during the transmission of control codes. During the transmission of control codes, the path over back contact *b* of relay OC to the winding of relay OTC is also closed but this is not relied upon for code transmission. During the reception of indication codes, back contact *b* of relay OC controls relay OTC to retransmit the received indication code over the carrier channel back to the remote stations for synchronization and coordination purposes. A third circuit path including front contact *b* of relay KTE opens during the first step of any coding action and remains open after the timing chain within the coding unit has completed its operation. It is to be noted, however, that this circuit over front contact *b* of relay KTE will hold relay OTC energized during the initial part of the first step of the indication code for the slow release period of relay KTE. A final fourth path in the circuit network includes front contact *b* of relay OLBPP, which is closed at the completion of the timing chain action within the coding unit, and front contact *b* of the relay FSK1, which repeats the first step of an indication code. Relay FSK1 is energized when relay OR releases at the beginning of the first indication code step to close its back contacts. The circuit further includes back contact *b* of relay OMPA, which remains released during indication codes and thus checks the type of code, and back contact *c* of relay OLBPP which is initially closed. Relay FSK1 picks up to close its front contact *a* to bypass back contact *c* of relay OLBPP and supply holding energy during the first step of this indication code. When relay OR picks up at the end of the first step to open its back contacts, relay FSK1 is deenergized and releases and is not then again energized during the coding action. Therefore OTC is held energized during this first step of the indication code until it briefly releases at the termination of the code step since all paths through the circuit network are briefly open.

The normal carrier apparatus unit at the office is coupled to the communication channel, indicated as being the O line extending to the stations and remote terminals, through a low pass filter of a conventional type. It is to be noted, as indicated, that frequency F1 is used for the transmission of control codes which indication codes are received over a frequency F2, each of these frequencies being frequency shift keyed to transmit the corresponding codes. The standby carrier apparatus transmits a single frequency F3 in each direction utilizing two circuits in a C type carrier system for the outgoing and incoming codes. The frequency is established by the F3 oscillator unit coupled to the standby carrier unit. In the conventional manner, the C system terminal is coupled to the O line by a conventional high pass filter. The transmission from the standby carrier apparatus could utilize circuits in other types of carrier units and is not limited to the use of such a C carrier system. Similar filter couplings of the carrier apparatus at each of the stations and remote terminals are conventionally illustrated by block diagrams on the drawing sheets for those locations.

Referring now to FIG. 2, there is shown the carrier and interface circuits at a typical intermediate remote controlled station which is bridged across the communication channel along the single portion or either of the branch channels. When the normal carrier apparatus is in use, the communication channel is bridged, under inactive conditions, through the station from the entry line at the upper left through the low pass filter, back contacts $a$ and $b$ of a master repeater relay MPB, and through the low pass filter at the upper right to the line to the more distant stations, the line circuits here representing the communication channel. The normal carrier unit terminals L1 and L2 are bridged across this line on the office side through a coupling pad. When the illustrated station is transmitting an indication code, so that the relay MFB picks up to repeat the master relay in the field line coding unit, front contacts $a$ and $b$ of this relay contact terminals TX, the transmitting output of the carrier unit, to the line circuit to the office. Front contact $c$ of relay MPB contacts a resistor shunt across the line circuit connections to the more distant station. Normally terminals TX of the unit are shunted through back contact $d$ of relay MPB and a resistor unit but this shunt is opened when the station transmits.

When standby carrier apparatus is in use, the circuit from the office to the stations is coupled through a high pass filter, the C terminal, a four-way bridge unit, and back contacts $a$ and $b$ of master repeater relay MPA to the corresponding C system terminal and high pass filter and thence to the line to the more distant stations. A tap from the four-way bridge unit to the local carrier apparatus provides for reception of control codes at this location. Indication codes from more distant stations are received through the high pass filter and C terminal and applied to terminals 1 and 2 of the standby carrier apparatus which are the frequency determining terminals and thence output from terminals 5 and 6 through the other C terminal unit and filter to the line circuit to the office. If this illustrated station is transmitting an indication code, relay MPA is energized to repeat the master relay and shunts the output of the four-way bridge unit to more distant stations over its front contacts $a$ and $b$ through a resistor unit. Under these circumstances, the open back contacts $a$ and $b$ of this relay interrupt the channel to the more distant stations and terminals. The normal and standby carrier apparatus at each station is similar to that at the office location except that the normal carrier unit is provided with the bridging module and thus the output transmitting terminals TX. The usual contacts CP and F/S within the normal carrier unit provide the same operation as at other locations. The circuit for the terminal alarm relay TA at this location extends from the ground terminal connected to the heal of contact CP and thence over back contact CP to the winding of the relay TA and terminal V. This relay has the usual slow pickup period to assure that the energy is applied due to a carrier channel failure and not a temporary surge. When its contact $a$ is finally closed, the change-over relay CO is energized and picks up.

At the lower right of FIG. 2 is the dot-dash rectangle representing the field line coding unit at the remote station. This is the same type of unit as used at the office with minor modifications because of the slightly different operation at the field location. The same three relays are shown but only a single contact means of each is involved in the control of carrier transmission and coordination. Each of the contacts is designated by the lower case letter reference as the similar or corresponding contact in the office unit except that a front contact of relay 1T is used rather than a back contact to control the station carrier transmitter relay TC. Relay TC thus repeats the operation of relay 1T, picking up and releasing as the unit transmitter relay follows or operates in a coded manner to transmit the code. The timing chain repeater relay LBP controls its repeater over its front contact $b$ so that relay LBPP is picked up whenever relay LBP picks up which is during any coding action. The master relay M, over its front contact $c$, controls a direct repeater relay MP which repeats its operation. Two other direct repeaters follow relay M depending upon whether the normal or standby carrier apparatus is in service. Relay MPB is energized during the transmission of indication codes when the normal carrier apparatus is in use with the circuit from contact $c$ of relay M including back contact $a$ of relay CO. A similar circuit over front contact $a$ of relay CO energizes relay MPA when the standby apparatus is in use. A stick repeater relay 2MPS also repeats the master relay M beginning with the second step of an indication code. Relay 2MPS is energized when relay R picks up at the beginning of the second code step to close its front contact $c$, the circuit further including front contact $a$ of relay LBPP, front contact $a$ of relay MP and the upper winding of relay 2MPS. This relay picks up and closes its front contact $a$ to complete a stick circuit through its lower winding which also includes front contact $c$ of relay M. Relay 1A repeats the first step of any coding action. This relay is energized when relay R initially releases to close its back contact $d$, the circuit further including back contact $b$ of relay LBPP and the winding of relay 1A. Relay 1A picks up, closing its front contact $a$ to complete a stick circuit which bypasses back contact $b$ of relay LBPP which shortly opens. When relay R picks up at the end of the first code step, relay 1A is deenergized and releases.

The receiver relay R of the station which is associated with the line coding unit operates in a conventional manner providing coded energy from terminal B of the local source to the various terminals of the coding unit to drive the internal apparatus. This relay is normally energized through its single winding by the circuit between terminals B and N including back contact $b$ of relay 2MPS, back contact $a$ of the station carrier receiver relay C, and back contact $b$ of relay 1A. During control codes, relay R is controlled by back contact $a$ of relay C as the carrier pulses are received to drive the coding action. During the first code step, contact $b$ of relay 1A picks up closing in its front position to also include back contact $a$ of relay TC in the circuit for relay R. However, at the end of the first code step back contact $b$ of relay 1A is again closed. During the transmission of indication codes, relay R also releases during the first code step when back contact $a$ of relay C opens in response to the code pulse retransmitted by the office apparatus. Relay 1A then picks up to close its front contact *b*. Thus when relay C shortly releases, relay R remains released, since back contact *a* of relay TC is open, until this latter relay releases at the end of the first code step action within the coding unit. At the beginning of the second indication code step, front contact *b* of relay 2MPS closes to transfer the control of relay R to back contact *a* of relay TC. Relay R thus follows the coding action of relay TC and thus the operation of relay 1T to drive the remaining elements of the coding unit to generate the indication code. Obviously, back contact *a* of relay C is eliminated from the control of relay R when the particular station is transmitting an indication code but otherwise drives the local unit by the retransmitted code from the office location when other more distant stations are transmitting.

All codes transmitted from the office, whether control codes or retransmitted indication codes, are received at a station by its relay C. Under normal operating conditions, relay C is periodically energized by the coding following action of contact F/S over front contacts CP and F/S of the carrier unit and back contact *b* of relay CO. When standby apparatus is in service, front contact *b* of relay CO connects relay C directly to the output or receiver terminal R of the carrier apparatus. All control codes are received by this station but are selectively registered only when the particular station address is included in the station selection part of the coding action. Relay C also follows retransmitted indication codes to keep the field line coding unit at its corresponding station busy and locked out from initiating any codes, all in the conventional manner. Relay TC drives the carrier apparatus to transmit indication codes from the station location. Under normal conditions, front contact *c* of relay TC closes, repeating the code of relay 1T, to periodically complete the bridging connection across the FM key contacts of the normal carrier unit. This causes the corresponding code pattern to be transmitted from output terminals TX to the communication channel. When the standby is in use, contact *b* of relay TC, which is normally closed in its back position to the ground terminal, alternately connects terminal V and the ground terminal to the keying terminal K of the standby carrier unit over front contact *c* of relay CO which is closed under these conditions. It will be noted that back contacts *c* and *d* of relay CO connect the K and R terminals, respectively, of the standby carrier apparatus to terminals Z which represents the apparatus which normally uses the standby carrier circuits.

The arrangement at each remote terminal station at the far end of the branch channels as illustrated in FIG. 4 is similar to that provided at each immediate station as described for FIG. 2. The interface circuitry is nearly identical with the single exception that no relays MPA and MPB are required. The other relays are controlled in the same manner as in FIG. 2 by the field line coding unit. The specific showing in FIG. 4 allows for a separation of the carrier terminal location and the actual remotely controlled field station associated therewith. This spacing is designated by the vertical dot-dash line near the center of the drawing. This separation requires an additional interface relay TCP which repeats the operation of the usual relay TC at the field station and permits the use of only three line wires between the carrier terminal and the field station. One wire extends a connection to terminal V of the higher voltage source at the carrier location to the field station. Relay TCP is then controlled by front contact *b* of relay TC which applies voltage from terminal V to one terminal of the winding of relay TCP, the other winding terminal being connected to the ground terminal. Contacts of relay TCP then control the various carrier units to transmit indication codes when such operation is appropriate. For example, the normal carrier apparatus FM key terminals are periodically bridged by front contact *c* during the transmission of indication codes when the normal apparatus is in use. Similarly, contact *b* of relay TCP alternately connects terminal K of the standby carrier apparatus, over front contact *c* of relay CO, to terminals V and the ground terminal of the higher voltage source at this terminal location.

The receiver relay C for the field station is controlled over the third line wire, with the other terminal connected to the line wire from terminal V. This third line wire is connected either to the normal or the standby carrier unit depending upon the position of contact *b* of changeover relay CO. The carrier unit connections to the channel at this terminal location are simpler, of course, than those at the intermediate stations. The normal carrier apparatus is provided at this location with a hybrid module so that the transmission and reception of codes is through the usual channel connection terminals L1 and L2. It may be noted that the AM key terminals of this unit are permanently bridged to provide a continuous transmission of the carrier as long as the unit is functioning properly. With the standby carrier apparatus, an oscillator for the frequency F3 is required since transmissions originate at this location and the frequency must be established between this location and the junction terminal. It will be noted that the transmission from the normal unit is by frequency F1 which is frequency shift keyed for the indication codes while control codes are received by pulsed current of frequency F2. The reason for this, as compared with the transmissions from the control office, will become apparent shortly in connection with the junction terminal description.

Turning now to FIGS. 3A and 3B, we shall describe the arrangement at the carrier terminal junction location of the communication channels and the circuit arrangement for the associated satellite stations which are connected to the junction station by a direct current line circuit. Two satellite stations W and X are shown in FIG. 3B. They are connected to the carrier terminal at the junction by a five wire line circuit whose lines are designated by the references 1 through 5, inclusive. These five line wires provide the matching interconnections between the two sheets 3A and 3B when FIG. 3B is placed to the left of FIG. 3A. Although only two station locations are shown, our system is not limited to this number of stations although only those within a reasonable distance from the junction location may be so connected and so controlled. Station W may actually be at the junction location with its apparatus contained within the same housing unit as the carrier terminals and interface relays. In this situation, the line wires 1 to 5 connecting between the two drawing figures become internal house wiring and convert to an external line circuit only as they leave station W, i.e., at the dot-dash divider in the center of FIG. 3B. Each such satellite station is equipped with a field line coding unit and the associated interface apparatus, all which is identical to that shown for the remote terminal station in FIG. 4. Again the operation of this apparatus is similar to that described for the intermediate stations of FIG. 2 except that the relays MPA or MPB are required at each station. Rather, two relays so designated and providing similar operation are located as a single pair for all the satellite stations at the junction carrier terminal location. Each station has its own local direct current source for operation of the coding unit and interface apparatus designated by the conventional terminals B and N. Sufficient energy for operation of the five wire line circuit and the resulting control of the carrier units is provided by the higher voltage source at the junction location directly associated with the carrier units and designated, as previously defined, by the terminal V and the conventional ground connection symbol. Line wires 1 and 2, therefore, are connected to the ground terminal and terminal V, respectively, and are continuous through all the satellite stations to provide connections to this energy source at each station location. Line wire 4, to be shortly described, also extends as a continuous circuit through each station location but wires 3 and 5 from the junction location are broken over relay contacts at the various stations and extend as separate segments from one station to the next.

Control codes are received at each station by the usual receiver relay C. However, this station relay is not here controlled directly by the carrier unit but by an added interface relay, the office line carrier receiver relay OLC shown in FIG. 3A. Relay OLC is controlled, depending upon the position of relay OLTA, by the normal or standby carrier unit receiving control codes direct from the O line to the office. The coded operation of the contacts of relay OLC then retransmits this control code both to the branch carrier channels, as will be explained, and over line wire 5 to the satellite station locations. Relay C at station W, with its winding connected between line wires 5 and 2, is then controlled as contact $a$ of relay OLC alternately connects to the ground and V terminals so that relay C follows its operation. Relay C at station X is controlled in a similar manner but over back contact $c$ of relay MP at station W which connects line wire 5 over its extension wire 5A to the winding of relay C at station X, the other terminal of this relay winding being connected to line wire 2. Another extension of line wire 5 extends over back contact $c$ of relay MP at station X and wire 5B to the next station, if existing, of the satellite network. Therefore, when station W, as an example, transmits an indication code so that relay MP is picked up, the open back contact $c$ of this relay interrupts the transmission of the retransmitted indication code received from the office location by relay OLC to the more distant satellite stations.

Each station has a transmitting relay TC for control of the transmission of indication codes. However, once again this relay does not directly control the carrier unit transmission but rather actuates another added interface relay, the line carrier transmitter relay LTC at the junction location in FIG. 3A. The use of these added interface relays OLC and LTC permits the use of only five line wires and therefore is a matter of convenience and economy. When station W transmits an indication code so that its relay MP is picked up, front contact $b$ of this relay connects contact $b$ of relay TC over line wire 3 to the winding of relay LTC, the other terminal of which is connected to terminal V of the source. As relay TC follows the coding action, driven by front contact $c$ of relay 1T, its contact $b$ alternately picks up and releases, i.e., connects the ground and V terminals on line wires 1 and 2 to line wire 3, to cause relay LTC to repeat this action. The opening of back contact $b$ of relay MP at station W interrupts the extension of line wire 3 over the extension wire 3A to the more distant stations and thus inhibits the transmission of any code from stations such as X. As previously mentioned, the opening of back contact $c$ of relay MP at station W interrupts the circuit for controlling the C relays at these distant stations and over front contact $c$ of relays MP provides a connection to the ground terminal so that the relays C at the more distant stations are picked up and held locked out during the indication codes from station W. Front contact $d$ of relay MP at station W, when closed during the transmission of indication codes, connects the ground terminal from line wire 1 to line wire 4 and thus energizes, depending upon the position of contact $d$ of the office line changeover relay OLCO at the junction, either repeater relay MPB or relay MPA. As will be discussed later, the pickup of relay MPB or MPA exercises priority for the satellite line stations over those connected to the branch channels. If station X is transmitting the indication code, relay LTC then is controlled over line wire 3, back contact $b$ of relay MP at station W, line wire extension 3A, and front contact $b$ of relay MP at station X to contact $b$ of relay TC which drives in accordance with the coding action of the line coding unit at that station. Relay MP at station X closes its front contacts and opens back contacts to provide similar control of the relays at the junction and interruption of the line circuits to any more distant stations. The retransmitted code from the office, through relay LTC, drives relay C at station W to inhibit the initiation of an indication code.

Turning now to the junction location in FIG. 3, the O line or channel to and from the office enters at the upper left. Associated therewith are the normal carrier apparatus in the lower left and the standby carrier apparatus in the upper left together with the associated filters and the C carrier terminal unit. At the upper right of this drawing figure are shown the carrier units for the first branch channel, which is designated the A line, together with the corresponding filters, and C system terminal. At the lower right are the carrier apparatus, filters, and C system terminal associated with the other branch channel, designated the B line. It is to be noted that the normal carrier unit frequencies are reversed in each branch. In other words, the basic transmission frequency or outgoing carrier current is of the F2 frequency for each branch while indication codes are received by carrier current of the F1 frequency level. It will be remembered, as indicated in the upper left, that control codes are received from the office by current of the F1 frequency while indication codes are retransmitted to the office by carrier current of the F2 frequency level. This transposition of carrier current frequencies at this location eliminates any regenerative feedback or "ringing" within the junction terminal apparatus.

Each normal carrier unit has an associated terminal alarm relay TA to detect failure within that unit or the absence of the carrier current received over the incoming communication channel. For the branch line units, the TA relays control only the transmission of alarm indications to the central control office with such circuits indicated at the center right of this drawing figure. These indications may be transmitted, for example, over permanently assigned channels in the C carrier system in use for general communications purposes, this being done to assure reception of such terminal alarm indications at the office in the event other normal channel apparatus has failed. The O line unit relay OLTA picks up in the usual manner at the end of its slow pickup period to repeat the closing of back contact CP within this normal carrier unit. Relay OLTA has a repeater relay, the O line changeover relay OLCO whose pickup circuit is closed when front contact *a* of relay OLTA closes. However, the energization of relay OLCO also checks that back contact CP is also closed. Because of the number of changeover contacts needed at this junction terminal, both relay OLTA and OLCO contacts are used, at least as a matter of convenience in the circuit diagram. It is to be noted that, when relay OLCO picks up, its back contacts *a* and *g* open the bridging circuits across the AM key terminals of the A and B line normal carrier units, respectively, to assure the turnoff or interruption of the carrier current transmission over these two branch channels. This actuates the changeover to the standby apparatus at intermediate stations along each of these branch channels and at the remote terminal locations, such as shown in FIG. 4, at the distant terminal end of these branch communication channels. This is used and necessary in the event the system operator changes manually to the standby apparatus at the office location because of some terminal or fault alarm which he has received.

Control codes from the central office are received at the junction location by the previous mentioned relay OLC which is normally driven by contact F/S in the normal carrier apparatus over back contact *b* of relay OLTA. Obviously, if the standby carrier apparatus is in use, the output from terminal R of this unit front contact *b* of relay OLTA drives relay OLC. The code following operation of contact *a* of relay OLC drives the C relays at the various satellite stations over line wire 5 in a manner previously described. The control codes are also retransmitted over both of the branch channels. For example, front contact *b* of relay OLC periodically completes the shunt or bridging connection across the FM key terminals of the normal carrier apparatus for the A line. Front contact *c* of relay OLC performs a similar function in connection with the normal carrier apparatus for the B line. It is to be noted and will be shortly described, if the standby carrier apparatus is in use in the system, control codes are transmitted directly to the branches by the various channel or line circuit connections without retransmission within the junction terminal.

Each branch channel has a similar carrier receiver relay. For example, the relay AC is associated with the A line apparatus and is normally operated or controlled by contact F/S in the normal carrier unit for the A line over back contact *c* of relay OLCO. If the standby apparatus is in use, the output from terminal B of this A line unit over front contact *c* of relay OLCO drivers relay AC. The corresponding receiver relay BC for the B line is normally driven by the operation of contact F/S of that normal carrier unit over back contact *f* of relay OLCO and by the output from terminal R of the standby carrier apparatus over front contact *f* of relay OLCO. A simple front contact repeater relay ACTE repeats the closing of front contact *a* of relay AC. However, this relay ACTE is provided with a slow release characteristic so that it bridges the open circuit or open coding times of this front contact of relay AC and remains picked up during the reception of an indication code from the A line branch. The purpose of relay ACTE is to maintain the priority for indication codes from the A line, as will be discussed shortly.

Indication codes received from the A or B branch channel or initiated at the satellite stations are retransmitted to the office for registry. The satellite station codes are transmitted by relay LTC which in the manner previously described is driven by the coding action of the TC relay at the transmitting station. The code following operation of front contact *c* of relay LTC provides a coded bridging circuit across the FM key terminals of the normal carrier apparatus associated with the O line. Contact *b* of relay LTC drives the standby carrier apparatus, when in use, by alternately connecting terminal K of this standby apparatus, over front contact *c* of relay OLTA, to terminal V and the ground terminal of the higher voltage source to transmit the indication code to the office. The ground connection from back contact *b* of relay LTC is provided, under these circumstances, over front contact *e* of relay MPA which will be picked up in response to the energization of the MP relay at the active satellite station.

When an indication code from the A line is received, the bridging circuit across the Fm key terminals of the O-line normal carrier unit is traced over front contact *b* of relay AC and back contact *a* of relay MBP. Contact *b* of relay AC of course follows the code pattern received from the A line while the check over back contact *a* of relay MBP assures that no coding action is occurring at any of the satellite stations which have priority. To transmit over the standby carrier apparatus, the circuit is traced from keying terminal K of the standby apparatus associated with O line over front contact *c* of relay OLTA, back contact *b* of relay LTC, back contact *e* of relay MPA to contact *c* of relay AC which periodically closes in its front and back conditions, alternately connecting to terminal V and to the ground terminal over front contact *b* of relay ACTE which remains picked up during the coding operation of relay AC. When an indication code is being received over the B line, the retransmission circuit for bridging the FM key terminals of the normal carrier apparatus includes front contact *b* of relay BC, back contact *a* of relay ACTE, and back contact *a* of relay MPB. The two back contacts included in this bridging connection assure that there is no priority coding action from either the satellite stations or from a station along the A line, while front contact *b* of relay BC repeats the code pattern received over the B line for retransmission to the office. Under standby carrier apparatus conditions, the retransmission circuit to terminal K of the standby apparatus which includes front contact *c* of relay OLTA, back contact *b* of relay LTC, back contact *e* of relay MPA, back contact *c* of relay AC, back contact *b* of relay ACTE, and contact *c* of relay BC which alternately closes in the coding pattern to connect to terminal V and to the ground terminal over its front and back contacts, respectively. Again this circuit checks that relays MPA and ACTE are released to assure that no coding action of a priority nature is occurring at any of the other branch lines.

As was previously mentioned, since any station along any portion of the communication channels can start a code at any time, and since simultaneous code starts are entirely possible, a priority selection is required to separate the indication codes being transmitted from various stations. The description of the intermediate stations of FIG. 2, when connected along the main communication channel between the office and the junction terminal, included a definition of how such stations exercise priority in the transmission of indication codes over stations more distant from the office. It is also to be noted, from the preceding description of the circuits at the junction terminal location which are used to retransmit indication codes to the office from the local satellite stations and stations on the A or B lines, that these circuits include checks that code transmission is not already under way from some other station. This check and the exercise of priority is provided chiefly by the contacts of relays MPB and ACTE. In addition to the already traced circuits for the code retransmission, it is to be noted that front contacts $b$ and $c$ of relay MPB provide bridging connections across the FM key terminals of the normal carrier apparatus for the A and B lines, respectively, to actuate the continuous transmission of a frequency shifted carrier signal along these circuits when one of the satellite stations is transmitting code. This activates and locks out the intermediate stations to and including the remote terminal location along each of these branch carrier channels. This allocates a priority to the satellite stations over those along branch channels even under simultaneous code start conditions. Also, when relay OLC receives the indication code retransmitted back from the office in the manner previously described, the operation of its front contacts $b$ and $c$ maintain the stations along the A and B channels activate so that a new station cannot start a code until the existing coding action has been completed. As was apparent in connection with line circuits to the satellite station, the nearer station has priority over any more distant station from the junction terminal location in the transmission of an indication code. Also the retransmission of the code along this line circuit by contact $a$ of relay OLC maintains such stations busy and thus unable to initiate a code once an indication code has started at another station. When an indication code is first received over the A line, the pickup of relay ACTE provides a bridging circuit at its front contact $c$ across the FM key terminals of the B line normal carrier apparatus to transmit a continuous signal which locks out the stations along the line and thus allocates priority to the A line stations. Since relay ACTE, because of its slow release characteristics, holds its front contacts closed during the indication code action of relay AC, this lockout is continuous and maintained during the entire indication code.

When standby carrier apparatus is in use, control codes are passed from the C system terminal associated with the O line direct to the similar terminals associated with the A and B lines by the four-way bridge unit shown by conventional block which supplies the incoming signal to branch circuits and also to the local standby carrier unit at the junction location. The connections to the C system terminal for the A line are over back contacts $a$ and $b$ of relay MPA. During standby conditions, the connections to the C system terminal for the B line for control codes extends over back contacts $c$ and $d$ of relay MPA, front contacts $h$ and $i$ of relay OLCO, and back contacts $d$ and $e$ of relay ACTE. It may be noted at this time that back contacts $c$ and $d$ of relay OLTA and back contacts $b$ and $c$ of relay OLCO provide connections from the various standby carrier units to terminals Z for the usual use of the standby carrier circuits by other apparatus such as the telephone dial equipment. If a satellite station is transmitting an indication code, relay MPA picks up to close its front contacts $a$, $b$, $c$ and $d$ to terminate the four-way bridge outputs to lines A and B in resistors meanwhile opening, at the corresponding back contacts, the circuit connections to the A and B lines to thus lock out all stations along those lines from initiating an indication code. The absence of the F3 carrier current transmitted over the A line and B line causes such intermediate stations to hold in the locked-out condition during the entire indication code period. If an indication code is being transmitted from a station on the A line, contacts $d$ and $e$ of relays ACTE pick up to close front contacts and thus providing a resistance shunt across the output of the four-way bridge usually connected to the B line system. The opening of back contacts $d$ and $e$ of relay ACTE interrupt the circuit connections to the B line and thus the absence of the F3 carrier current over this line causes its intermediate and terminal stations to lock out during the transmission of the indication code by an A line station. Further, the opening of back contact $e$ of relay MPA, when a satellite station transmits, interrupts the key circuits for the O line standby carrier apparatus including contact $c$ of relay AC and also contact $c$ of relay BC. Correspondingly, the opening of back contact $b$ of relay ACTE when an A line station is transmitting a code interrupts the control of the standby carrier apparatus by contact $c$ of relay BC. In this latter circuit arrangement, the priority of simultaneous codes is allocated first to the satellite stations and second to the A line stations as compared with the stations along the B line.

The system of our invention thus provides an efficient and economical arrangement for adding new stations to a remote control system along a branch communication channel connected to the main channel at a junction terminal location. Our arrangement permits the establishment of coding priority for the system stations and enforces that priority order selected. Transmission of control and indication codes by the office and the stations, respectively, proceeds then in good and proper order without loss of any code due to scrambled operation. Synchronization and coordination of system operation is thus maintained.

Although we have herein shown and described but one specific arrangement of a coded carrier remote control system embodying our invention, it is to be understood that various changes and modifications therein may be made within the scope of the appended claims without departing from the spirit and scope of our invention.

Having now described the invention what we claim as new and desire to secure by Letters Patent, is:

1. In a remote control system, which includes a control office and remote junction location connected by a main communication channel, and a plurality of branch communication channels diverging from said main channel at said junction, over which channels control and indication functions are transmitted between said office and remotely controlled stations connected to said plurality of branch channels, the combination comprising, a. a transmitter-receiver means at said junction for each diverging channel coupled to the associated channel for transmitting and receiving functions to and from the corresponding stations, b. another transmitter-receiver means at said junction coupled to said main channel for transmitting and receiving functions to and from said office, c. retransmission means at said junction coupled between the several transmitter-receiver means for transmitting functions received from said office to the stations connected to said diverging channels and functions received from any station to said office, and d. priority enforcement means at said junction also coupled between said other transmitter-receiver means and the several diverging channel transmitter-receiver means and controlled by said retransmission means for enforcing a preselected order of priority to the transmission of functions between said office and the remote stations along said plurality of diverging channels.

2. A remote control system as defined in claim 1 which further includes, a. a priority enforcement means for each diverging channel controlled by the station function retransmission means for registering the transmission of functions received from stations on the corresponding channel to said office, b. each channel priority enforcement means coupled to the transmitter-receiver means for each other diverging channel having a lower transmission priority and responsive to the registration of a transmission from a station on its corresponding channel for transmitting a lock-out signal to inhibit the initiation of a function transmission from the stations connected to each lower priority channel.

3. A remote control system as defined in claim 1 in which said retransmission means comprises, a. a separate retransmission means for said main channel and for each diverging channel, each controlled by the corresponding transmitter-receiver means, 1. each diverging channel retransmission means coupled to the main channel transmitter-receiver means for transmitting to said office functions received from the corresponding channel stations, and in which said priority enforcement means comprises, b. a repeater means for each diverging channel controlled by the corresponding retransmission means for registering the initiation of a function transmission by a station connected to that channel and for holding that registry during the complete transmission, c. each repeater means coupled to the transmitter-receiver means of each lower priority channel for transmitting a lock-out signal when a transmission is registered to inhibit a function transmission by any station connected to said lower priority channel.

4. A remote control system as defined in claim 3 in which, a. said main channel retransmission means is coupled to each diverging channel transmitter-receiver means for transmitting to all stations function transmission received from said office, and b. each station is responsive to the retransmission of an office function transmission over the corresponding diverging channel for inhibiting the initiation of a function transmission from that station during the continuing office function transmission.

5. A remote control system as defined in claim 4 in which, a. a first priority diverging channel directly connects one or more satellite stations to said junction without an intervening transmitter-receiver means, 1. said main channel retransmission means directly connected to said first priority channel for transmitting office function transmission to said satellite stations, and which further includes, b. a transmitting condition repeater means at said junction connected by said first channel to each satellite station and controlled thereby for repeating the function transmitting condition existing at any satellite station, c. said transmitting condition repeater means further coupled to the transmitter-receiver means of each other diverging channel for transmitting a lock-out signal to the stations connected to each such other channel to inhibit the initiation of function transmission by any other station when any satellite station has initiated a function transmission.

6. A remote control system as defined in claim 5 in which, a. each retransmission means is a relay controlled by the corresponding transmitter-receiver means for repeating the pattern of the received function transmission, 1. each retransmission relay controlling each other transmitter-receiver means to which coupled for retransmitting an equivalent function transmission pattern over each corresponding other channel, b. each priority enforcement repeater means is also a relay controlled by the associated retransmission relay for repeating the initial response to a function transmission from a station and operable for holding in the response position while said associated retransmission relay follows the continued function transmission pattern, 1. each repeater relay coupled to each lower priority channel transmitter-receiver means for transmitting said lock-out signal when in its response position, c. said transmitting condition repeater means is also a relay controlled by said satellite stations and operable to hold in a repeating position when any satellite station is in its function transmitting condition, 1. said transmitting condition repeater relay coupled for actuating all other diverging channel transmitter-receiver means to transmit said lock-out signal when that relay occupies its repeating position.

7. A remote control system as defined in claim 6 in which, a. said control office is responsive to the reception of a station function transmission for retransmitting an equivalent pattern over said main channel to said junction location and thence to each diverging channel not locked out by the priority enforcement relay corresponding to the channel of the transmitting station, b. each non-locked-out station is responsive to the reception of said office retransmitted equivalent pattern for inhibiting the initiation of any function transmission, and c. the active transmitting station is operable for shifting its channel couplings to inhibit the initiation of a function transmission at a more distant station connected to the same channel until said active station completes the function transmission.

8. A synchronizing and coordination arrangement for a coded carrier remote control system; which system includes a main communication channel between the system control office and a junction terminal, a plurality of branch communication channels diverging from said junction terminal, each connected to at least one more distant remotely controlled station operable to receive and at times transmit control and indication function codes, respectively, from and to said office; comprising in combination,
   a. a separate transmitter-receiver means at said junction terminal coupled to each channel for transmitting and receiving codes over that associated channel,
   b. a first retransmitting means at said junction controlled by the transmitter-receiver means of said main channel and coupled to each other transmitter-receiver means for retransmitting codes received from said office to the stations connected to each diverging channel, and
   c. a plurality of other retransmitting means, one controlled by the transmitter-receiver means associated with each diverging channel and coupled to the main channel transmitter-receiver means for retransmitting codes received from the corresponding stations to said office,
   d. each other retransmitting means also coupled to the transmitter-receiver means of each diverging channel having a preselected lower transmission priority for transmitting a lock-out signal, when a code transmission is detected from a station connected to its own associated diverging channel, to inhibit the initiation and transmission of an interfering code by any station connected to a lower priority channel.

9. A synchronizing and coordination arrangement as defined in claim 8 in which,
   a. the first transmission priority diverging channel directly couples a plurality of satellite stations to the junction terminal arrangement without a transmitter-receiver means,
   b. said first retransmitting means comprises a first relay connected for receiving codes from the main channel transmitter-receiver means and coupled for transmitting the received code direct to said first priority channel and by the corresponding transmitter-receiver means to each other lower priority channel,
   c. the retransmitting means of said first priority channel comprises a second relay directly connected for receiving codes from said satellite stations and coupled to the main channel transmitter-receiver means for retransmitting each received code to said office,
   d. each other diverging channel retransmitting means comprises a relay coupled to the associated and the main channel transmitter-receiver means for receiving codes from the associated stations and for retransmitting each received code to said office,
and which further includes,
   e. a first repeater relay connected by said first priority channel to the satellite stations for repeating the code transmitting condition existing at any satellite station,
      1. said first repeater relay also coupled to all said other channel transmitter-receiver means for transmitting a lock-out signal to all stations of each lower priority channel for inhibiting the initiation of an interfering code when any satellite station initiates and transmits a code,
   f. another repeater relay for each other diverging channel, except that with lowest transmission priority, controlled by the corresponding retransmitting relay to repeat the initiation and continued code transmission from any station connected to corresponding channel,
      1. each said other repeater relay coupled to the transmitter-receiver means of each lower priority channel for transmitting a lock-out signal to inhibit the initiation and transmission of an interfering code by any station connected to a lower transmission priority channel.

10. A synchronizing and coordination arrangement as defined in claim 9 in which,
   a. said office is responsive to the reception of a code from any station for further retransmitting an equivalent code pattern back to said junction terminal and thence to each diverging channel not locked out to inhibit the initiation of a new interfering code by any other station during the existing code transmission,
   b. the active transmitting station is further responsive to the initiation of the code transmission for shifting its connections to the corresponding channel to inhibit the initiation of a code transmission by any more distant station connected to that channel.

* * * * *